(12) United States Patent
Lee et al.

(10) Patent No.: US 12,477,182 B2
(45) Date of Patent: Nov. 18, 2025

(54) TV AND METHOD FOR CONTROLLING SAME

(71) Applicant: LG ELECTRONICS INC., Seoul (KR)

(72) Inventors: Jinhee Lee, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/716,878

(22) PCT Filed: Dec. 6, 2021

(86) PCT No.: PCT/KR2021/018340
§ 371 (c)(1),
(2) Date: Jun. 5, 2024

(87) PCT Pub. No.: WO2023/106432
PCT Pub. Date: Jun. 15, 2023

(65) Prior Publication Data
US 2025/0047941 A1    Feb. 6, 2025

(51) Int. Cl.
*H04N 21/462* (2011.01)
*H04N 5/64* (2006.01)
(Continued)

(52) U.S. Cl.
CPC ............. *H04N 21/462* (2013.01); *H04N 5/64* (2013.01); *H04N 21/435* (2013.01); *H04N 21/8586* (2013.01)

(58) Field of Classification Search
CPC ...... H04N 21/462; H04N 5/64; H04N 21/435; H04N 21/8586; H04N 21/422;
(Continued)

(56) References Cited

U.S. PATENT DOCUMENTS

2019/0355328 A1    11/2019    Suk et al.
2021/0182008 A1    6/2021    Kim

FOREIGN PATENT DOCUMENTS

KR    1020150068556    6/2015
KR    1020150080238    7/2015
(Continued)

OTHER PUBLICATIONS

PCT International Application No. PCT/KR2021/018340 International Search Report dated Aug. 26, 2022, 12 pages.
(Continued)

*Primary Examiner* — Anthony Bantamoi
(74) *Attorney, Agent, or Firm* — LEE, HONG, DEGERMAN, KANG & WAIMEY

(57) ABSTRACT

According to an embodiment of the present invention, a method for controlling a TV having a screen, the exposure size of which is changed by a motor, comprises the steps of: outputting an audio content in a state where only a part of the screen is exposed or the screen is not exposed; detecting metadata related to the audio content; when at least one video content corresponding to the detected metadata can be provided at a current time, controlling the motor to fully expose the screen and outputting a first video content; and when at least one video content corresponding to the detected metadata can be provided after a current time, continuing to output the audio content and establishing a reservation for a second video content.

12 Claims, 16 Drawing Sheets

(51) Int. Cl.
*H04N 21/435* (2011.01)
*H04N 21/858* (2011.01)

(58) Field of Classification Search
CPC ......... H04N 21/42203; H04N 21/4316; H04N 21/439; H04N 21/47; H04N 21/472; H04N 21/4858; H04N 21/84
See application file for complete search history.

(56) References Cited

FOREIGN PATENT DOCUMENTS

| | | |
|---|---|---|
| KR | 1020170032212 | 3/2017 |
| KR | 1020200075809 | 6/2020 |
| KR | 1020210119283 | 10/2021 |

OTHER PUBLICATIONS

European Patent Office Application Serial No. 21967305.0, Search Report dated Oct. 23, 2024, 4 pages.

(a)

(b)

(a)

(b)

(c)

(a)

(b)

(a)

(b)

(c)

(a)

(b)

(c)

(a)

(b)

(a)

(b)

TV AND METHOD FOR CONTROLLING SAME

CROSS-REFERENCE TO RELATED APPLICATION(S)

This application is the National Stage filing under 35 U.S.C. 371 of International Application No. PCT/KR2021/018340, filed on Dec. 6, 2021, the contents of which are all incorporated by reference herein in its entirety.

TECHNICAL FIELD

The technical field of the present disclosure includes various multimedia devices having displays, etc. For example, it is applicable to a Television (TV) having a variable size of an exposed screen.

BACKGROUND ART

In TV according to the related art, an entire area of a screen (screen) is always exposed. However, even when a user does not watch TV, there is a problem that the user may not fully utilize a space when a black screen is always exposed. Meanwhile, a service that uses only a partial area of a screen of a TV as a display is not provided.

In order to solve this problem, research is being conducted on a new form factor of TV.

DISCLOSURE

Technical Tasks

One technical task of the present disclosure is to provide a system that selectively allows a screen to be partially or fully exposed by using a motor or the like added to a TV.

Another technical task of the present disclosure is to specifically define a content displayed on a portion or entire area of a screen in order to minimize power consumption of a motor added to a TV. Since a motor operation is expected to consume more power than conventional TVs, it is a very important technology to define a specific content displayed in a specific mode.

Further technical task of the present disclosure is to provide a technology that automatically changes a level at which a TV screen is exposed by using the satisfaction of a certain condition (e.g., a presence or non-presence of mapping between user preference and metadata of audio content) as a triggering signal.

Technical Solutions

In one technical aspect of the present disclosure, provided is a method of controlling a TV having an exposed size of a screen changed by a motor, the method including outputting an audio content in a state of partially exposing the screen or not exposing the screen, detecting metadata related to the audio content, based on providing at least one video content related to the detected metadata at a current time, outputting a first video content by controlling the motor to fully expose the screen, and based on providing the at least one video content related to the detected metadata after the current time, setting a reservation for a second video content while continuing to output the audio content.

In another technical aspect of the present disclosure, provided is a TV including a memory storing at least one data, a motor changing an exposed size of a screen with reference to the memory, an audio output unit outputting an audio content in a state of partially exposing the screen or not exposing the screen, and a controller detecting metadata related to the audio content.

Based on providing at least one video content related to the detected metadata at a current time, for example, the controller may control the motor to fully expose the screen and output a first video content. Based on providing the at least one video content related to the detected metadata after the current time, the controller may continue to output the audio content and set a reservation for a second video content.

Advantageous Effects

According to an embodiment of the present disclosure, a system for selectively allowing a screen to be partially or fully exposed using a motor or the like added to a TV is provided.

According to another embodiment of the present disclosure, by specifically defining a content displayed according to an exposed screen size, there is a technical effect of minimizing unnecessary power consumption of a TV motor, etc.

According to further embodiment of the present disclosure, there is an advantage of providing a technology of automatically changing a level of exposing a TV screen by using the satisfaction of a specific condition (e.g., a presence or non-presence of mapping between user preference and metadata of audio content) as a triggering signal.

BEST MODE

Figure 1:
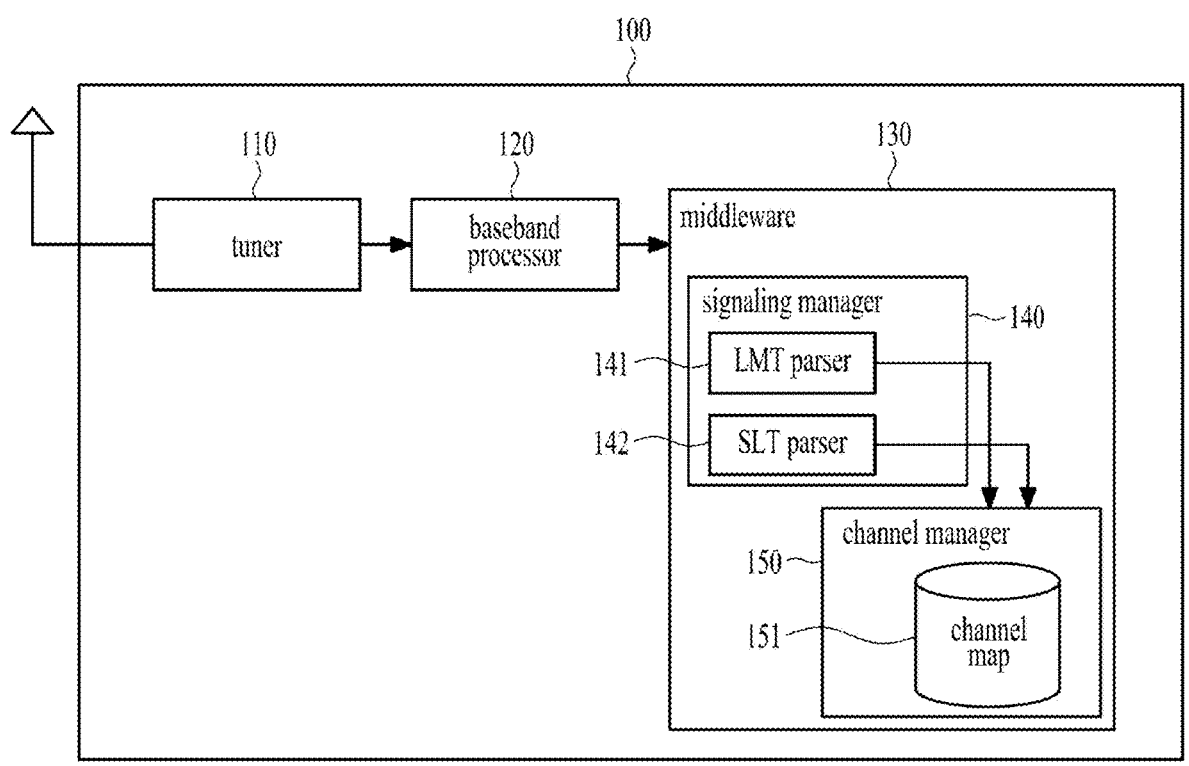
FIG. 1 is a diagram illustrating components inside a TV according to an embodiment of the present disclosure.

FIG. 1 is a diagram illustrating components inside a TV according to an embodiment of the present disclosure.

The present disclosure is applicable to various TV products, for example, the Digital Video Broadcasting (DVB) standard, which is a European standard, the Advanced Television Systems Committee (ATSC) 3.0 standard, which is a North American/Korean standard, etc.

In FIG. 1, a process for a TV 100 to perform and initial service scan operation in accordance with the ATSC 3.0 standard will be illustrated, but the scope of the rights of the present disclosure should be determined according to the matters described in the claims.

A tuner 110 determines whether a signal is present by using a predefined frequency list. If a signal is detected at a given frequency, a baseband processor 120 extracts L1 signaling of a preamble.

Furthermore, the baseband processor 120 transmits Physical Layer Pipe (PLP) data including link layer signaling and Low Level Signaling (LLS) to a middleware 130, and the middleware 130 may extract the link layer signaling and the LLS from the PLP data.

Meanwhile, the middleware 130 includes a signaling manager 140 and a channel manager 150.

The middleware 130 receives the PLP data including the link layer signaling and the LLS from the baseband processor 120 and passes the data to an appropriate parser.

For example, the middleware 130 extracts Link Mapping Table (LMT) from the link layer signaling and passes the LMT to an LMT parser 141. Furthermore, the middleware 130 extracts Service List Table (SLT) from the LLS and passes the SLT to an SLT parser 142.

The LMT parser 141 parses the LMT and extracts first information (e.g., PLPID, session information (IP address and port number), etc.) necessary to generate a channel map.

The SLT parser 142 parses the SLT and extracts second information (e.g., service id, service name, etc.) necessary to generate the channel map.

The extracted first information and second information are stored in a channel map 151.

Figure 2:
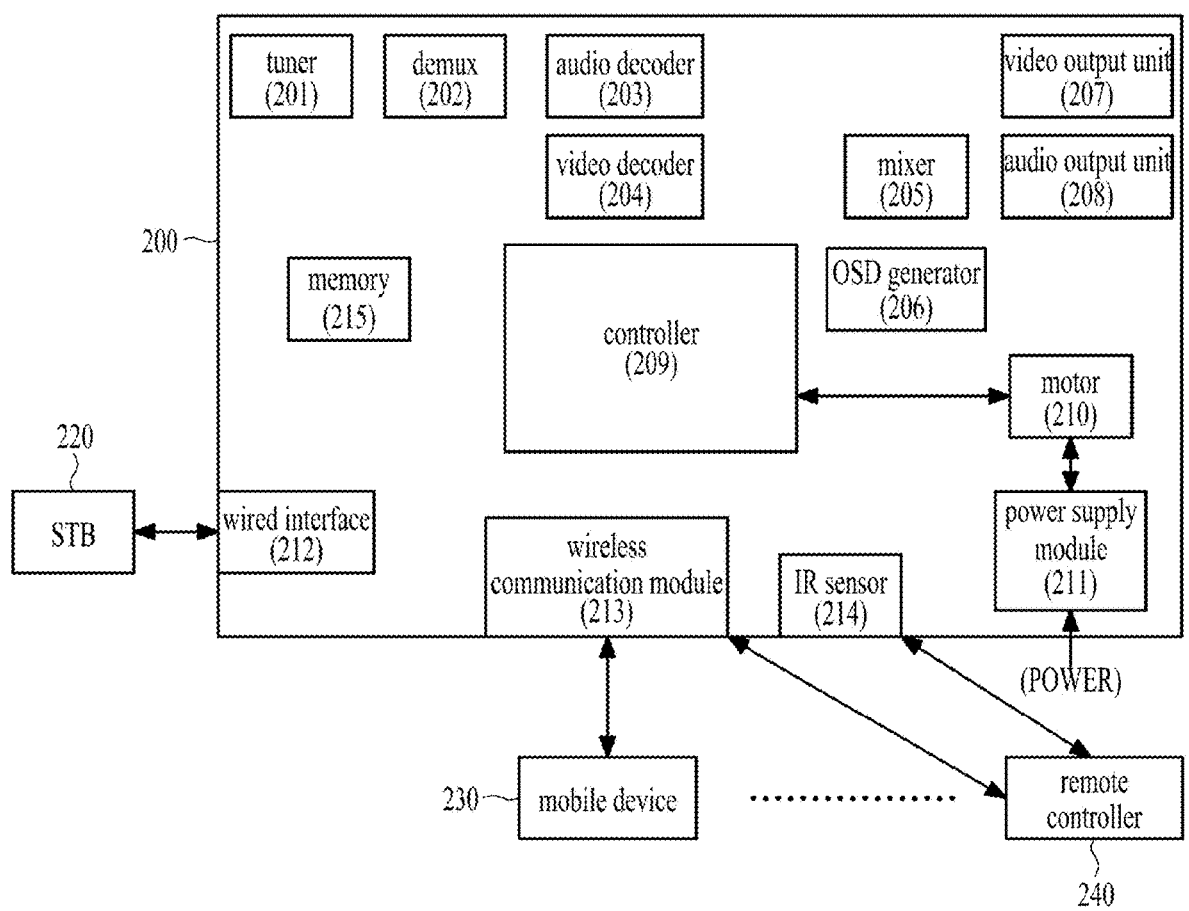
FIG. 2 is a diagram illustrating components inside a TV according to another embodiment of the present disclosure and an external device together.

FIG. 2 shows components inside a TV and an external device according to another embodiment of the present disclosure. Those skilled in the art may implement the present disclosure by combining some components with reference to FIGS. 1 and 2. For example, the baseband processor 120 and the middleware 130 shown in FIG. 1 may be included in a controller 209 shown in FIG. 2.

Although a TV 200 shown in FIG. 2 includes various components, the scope of the rights of the present disclosure is not limited thereto and should be determined according to the matters described in the claims.

Moreover, the components inside the TV 200 shown in FIG. 2 may be controlled through the controller 209, and each of the components may be directly or indirectly connected thereto. That is, although not shown in FIG. 2, all of the components inside the TV 200 of FIG. 2 are designed to directly or indirectly transmit and receive control signals and/or data.

First, a tuner 201 receives a broadcast signal through an antenna or the like, and a demuxer (demux or demultiplexer) 202 demultiplexes audio data and video data included in the broadcast signal.

An audio decoder 203 decodes the audio data (in encoded state) included in the broadcast signal, and a video decoder 204 decodes the video data (in encoded state) included in the broadcast signal.

The decoded audio data is outputted through an audio output unit 207. The audio output unit 207 may be, for example, a speaker attached to or spaced apart from the TV 200.

Meanwhile, the decoded video data is directly outputted through a video output unit 208. Alternatively, a mixer 205 mixes menu data generated by an OSD generating unit 206 and the video data and then transmits the mixed menu data to the video output unit 208.

A memory 215 stores various control data and commands for controlling the TV 200, and the controller 209 may control all components in the TV with reference to the memory 215.

Furthermore, the TV 200 transmits and receives data through communication with various peripheral external devices. For example, video and audio data are received from an STB 220 via a wired interface 212, and then processed by the audio decoder 203 and the video decoder 204, respectively. Alternatively, the received video and audio data may be directly outputted through the audio output unit 207 and the video output unit 208 without passing through the decoders 203 and 204.

Various data is transmitted and received with a mobile device 230 (e.g., a mobile phone, a wearable device, etc.) via a wireless communication module 213, and an infrared (IR) signal of a remote controller 240 is received through an infrared sensor 214. Alternatively, the remote controller 240 capable of Bluetooth communication such as BT transmits and receives various data to and from the TV via the wireless communication module 213.

Unlike the related art TV, the TV 200 according to an embodiment of the present disclosure further includes a motor 210 inside or outside the TV 200. Therefore, it becomes possible to freely control an exposed area of a screen of the TV 200 using the motor 210 (more specific embodiments related to this will be described in detail in FIGS. 3 to 6 below). On the other hand, the related art TV has a problem in that a full screen of the same size is always exposed.

According to an embodiment of the present disclosure, unlike the related art, since power needs to be additionally supplied to the motor 210 through a power supply module 211, a technology that minimizes power consumption by optimizing the control of the motor is important. And, it is required as a very important interface technology to specifically define what kind of information is supposed to be displayed depending on an exposed area of a TV screen. As mentioned above, the related art TV does not need to review the above technical requirements because a full screen of the same size is always exposed.

Figure 3:
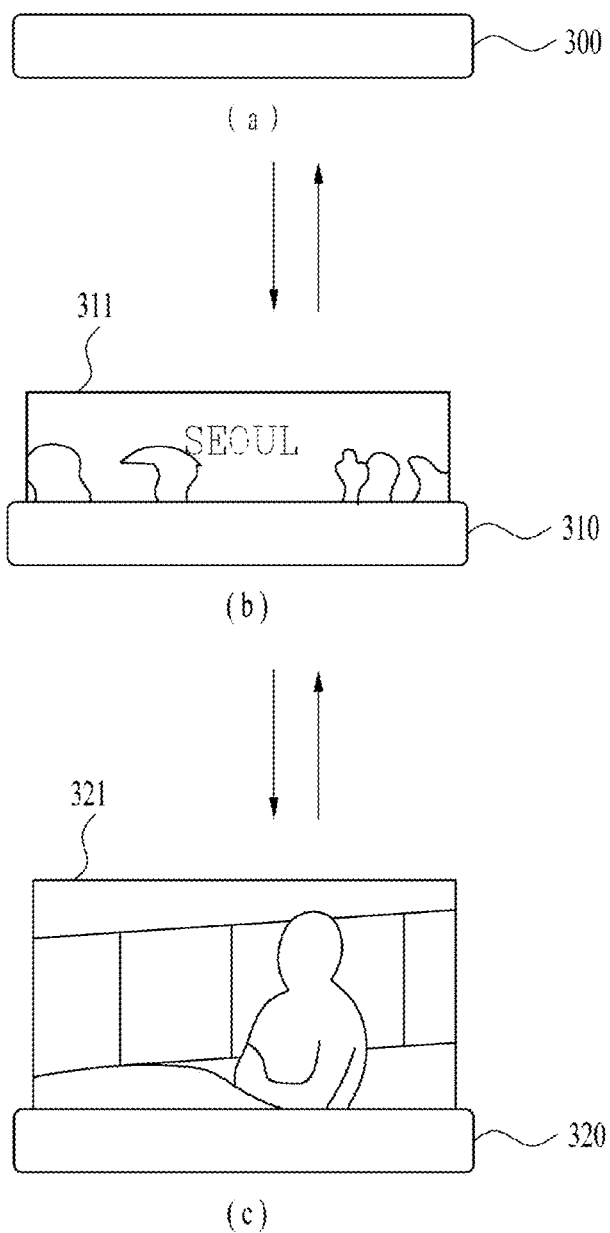
FIG. 3 is a diagram illustrating an exterior of a TV according to an embodiment of the present disclosure.

FIG. 3 illustrates an exterior of a TV according to an embodiment of the present disclosure.

Unlike the related art, the screen of the TV according to an embodiment of the present disclosure may be included in the housing 300, as shown in (a) of FIG. 3. When a certain condition is satisfied (for example, when a signal pressing a power button of a remote controller once is input), as shown in (b) of FIG. 3, only a partial screen 311 of the TV may be exposed from the housing 310. When another certain condition is satisfied (for example, when a signal pressing the power button of the remote controller twice is input), as illustrated in (c) of FIG. 3, an entire screen 321 of the TV may be designed to be exposed from the housing 320. Needless to say, a mode in (c) of FIG. 3 may be switched to a mode in (b) and a mode in (a) in a reverse direction, and the mode in (b) may be skipped.

To implement this, the screen 321 of the TV may include a material for forming a flexible display. For example, a bendable or rollable flexible display material may be for a plastic OLED (POLED or P-OLED), and may be finished with a colorless polyimide (CPI) film, which is a plastic material. Here, the CPI film is for a transparent but rigid plastic material like glass, may freely change a shape, and may not easily break even a pressure is applied.

The screen 321 may be wound around rollers inside the housing 320 and then unfolded, and a motor for driving the rollers may be required. This will be described below in more detail with reference to FIG. 6.

To be distinguished from the related art, a TV designed as shown in FIG. 3 may be defined as a rollable TV or a flexible TV, a mode illustrated in (a) of FIG. 3 may be defined as a zero view, a mode illustrated in (b) of FIG. 3 may be defined as a partial view, and a mode illustrated in (c) of FIG. 3 may be defined as a full view.

Figure 4:
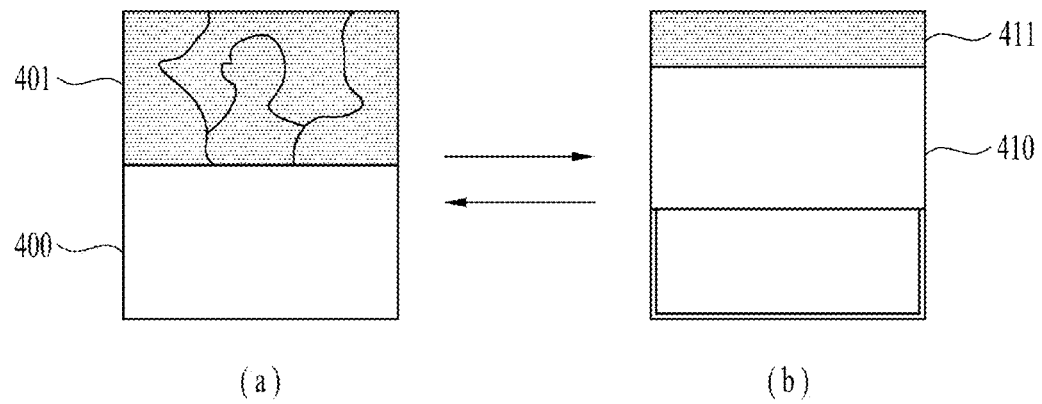
FIG. 4 is a diagram illustrating an exterior of a TV according to another embodiment of the present disclosure.

FIG. 4 is a diagram illustrating an exterior of a TV according to another embodiment of the present disclosure.

Although it has been described with reference to FIG. 3 that a flexible display material is used for a screen of the TV, the TV may not necessarily include a material for a flexible display, and a screen of a general TV may be used without change in the embodiment of FIG. 4.

However, differently from the related art, as shown in (a) of FIG. 4, covers 400 having the same size or similar sizes may be positioned under the screen 401 of the TV. When a certain condition is satisfied (for example, when a signal pressing a power button of a remote controller once is input), as shown in (b) of FIG. 4, a cover 410 may be designed to move in an up direction to expose only a partial TV screen 411. Needless to say, a mode in (a) of FIG. 4 may be switched to a mode shown in (a) of FIG. 4. To freely move the cover shown in FIG. 4 in an up/down direction, a motor may be designed to be positioned around the cover.

To be distinguished from the related art, the TV designed as shown in FIG. 4 may be defined as an Atelier TV, a mode illustrated in (a) of FIG. 4 may be defined as a full view, and a mode illustrated in (b) of FIG. 4 may be defined as a line view or a partial view.

Figure 5:
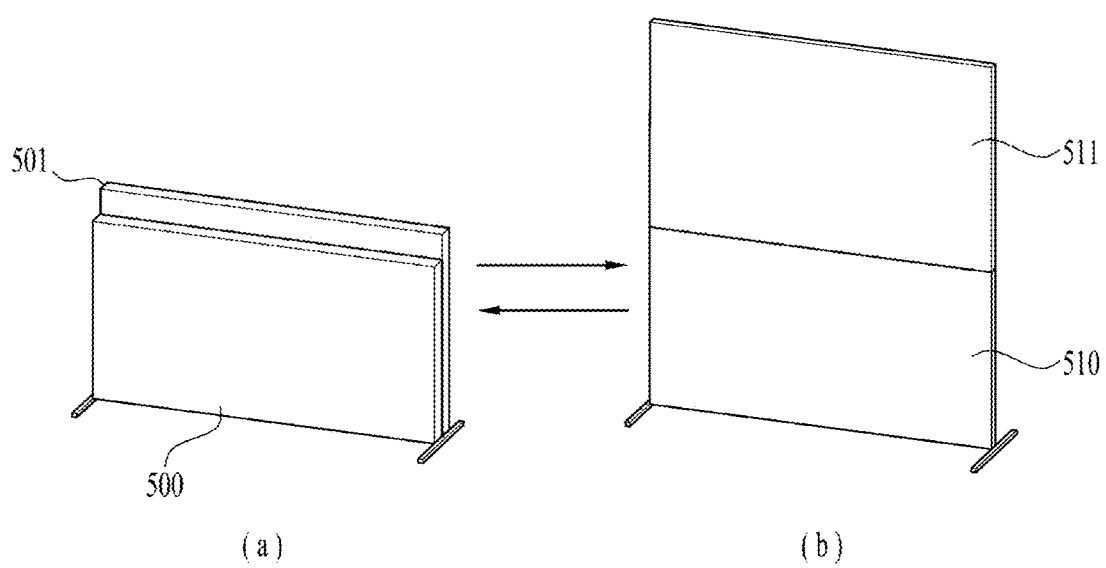
FIG. 5 is a diagram illustrating an exterior of a TV according to further embodiment of the present disclosure.

FIG. 5 is a diagram illustrating an exterior of a TV according to further embodiment of the present disclosure.

Similar to FIG. 4, a material for a flexible display may not necessarily be used as a TV screen, and a general display may be used without change. However, differently from FIG. 4, the TV screen other than a cover itself is moved.

For example, as shown in (a) of FIG. 5, the cover 500 having the same size or similar sizes is designed to be positioned under the TV screen 501. The TV screen 501 and the cover 500 may be apart from each other at a certain interval to prevent friction from being generated. When a certain condition is satisfied (for example, when a signal pressing a power button of the remote controller once is input), as illustrated in (b) of FIG. 5, the TV screen 511 may move in an up direction to design the entire TV screen 511 to be exposed. In this case, differently from FIG. 4, a cover 510 may not move.

Needless to say, in a mode of (b) of FIG. 5 may be switched to a mode of (a) of FIG. 5. To freely move the TV screen shown in FIG. 5 in an up/down direction, a motor may be designed around the TV screen To be distinguished from the related art, a TV designed as shown in FIG. 5 may be defined as an interior TV, a mode illustrated in (a) of FIG. 5 may be defined as a partial view or a line view, and a mode illustrated in (b) of FIG. 5 may be defined as a full view.

Figure 6:
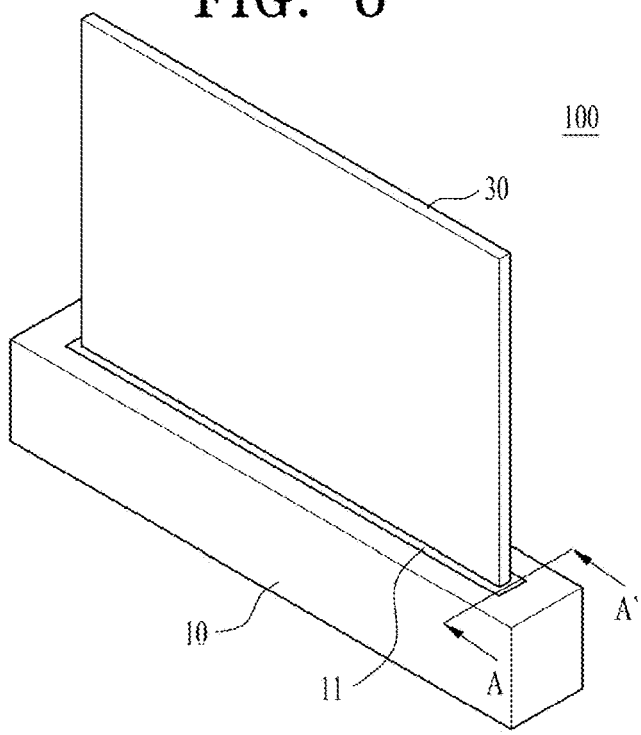
FIG. 6 is a diagram illustrating a motor for adjusting a screen size of a TV according to an embodiment of the present disclosure.
Figure 6:
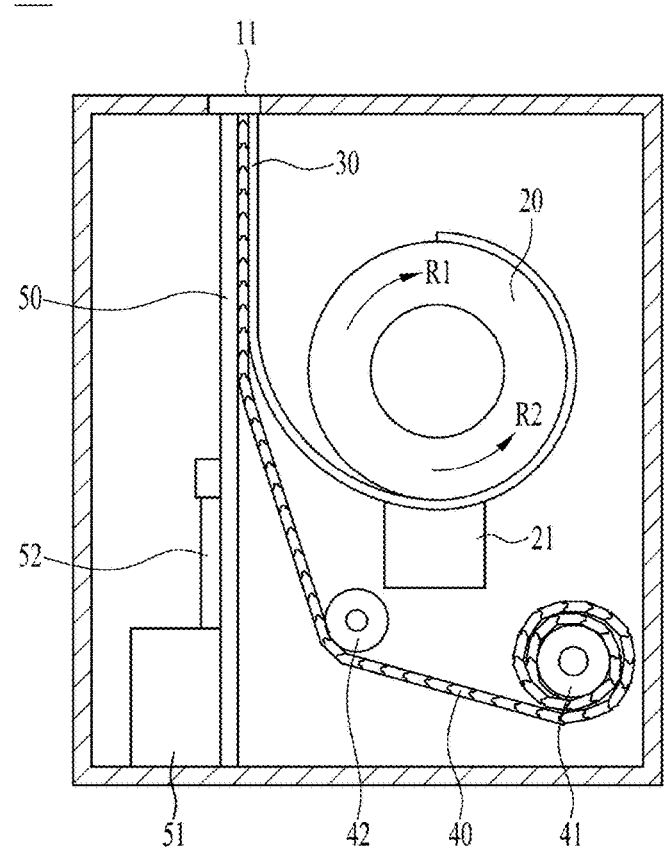

FIG. 6 is a diagram for explaining a motor for adjusting a screen size of a TV according to an embodiment of the present disclosure.

Although the motor is applicable to the embodiments of FIGS. 4 and 5, it is assumed that the motor is applied to the TV of FIG. 3 for convenience of description, and FIG. 6 will be described.

(a) of FIG. 6 illustrates a screen of the housing and the TV screen shown in FIG. 3 in a diagonal direction. (b) of FIG. 6 is a cross-sectional view taken along a line A-A' of (a) of FIG. 6.

As shown in (a) of FIG. 6, the TV system 100 may further include the housing 10.

The housing 10 may be configured to accommodate various components, and more particularly, the housing 10 may accommodate, for example, the screen 30 and various electronic components for operating the screen 30.

As shown in (b) of FIG. 6, the TV system 100 may include the roller 20 rotatably installed in the housing 10. Although not shown, the roller 20 may include sleeves formed at both ends, and the sleeves may be rotatably supported with respect to the housing 10 by bearings.

The roller 20 may be connected to the motor 21 installed in the housing 10, and may rotate in a clockwise direction R1 or a counterclockwise direction R2 as illustrated by the motor 21. To adjust a rotation speed of the roller 20, a gear train may be located between the motor 21 and the roller 20.

The TV system 100 may include the screen 30 configured to display various contents and information related to the contents. For example, the screen 30 may display video content, audio content, and other ancillary content. Such contents include various pieces of information associated thereto, for example, a playback time in a video content, a title of the content, and the like, and the display 30 may also display such relevant information.

The screen 30 may be accommodated in the housing 10 as illustrated in such a manner that the TV system 100 may have a compact structure. To accommodate the screen 30 in the housing 10, the screen 30 needs to be basically deformed. Accordingly, the TV system 100 may use a flexible display as the screen 30.

Due to this deformable property, as shown in (b) of FIG. 6, the screen 30 may be rolled on the roller 20. The screen 30 may be wound around the roller 20 or unwound from the roller 20 according to a rotation direction of the roller 20.

The screen 30 may be unwound from the roller 20 and project or roll out to the outside of the housing 10. On the contrary, the screen 30 may be wound around the roller 20 to retract/roll in the housing 10. In detail, as shown in (b) of FIG. 6, when the roller 20 rotates in a clockwise direction R1, the screen 30 may be unwound from the roller 20 and be expanded to the outside of the housing 10 through an opening 11 formed in the housing 10.

Therefore, as described above, a screen accommodated in the housing 300 in (a) of FIG. 3 may be extended to the outside of the housing 310 as shown in (b) of FIG. 3, and a screen 311 having a certain size may be formed. When the roller 20 further rotates in the clockwise direction R1, the screen 30 may be further unwound from the roller 20. Therefore, as shown in (c) of FIG. 3, the screen may protrude to a larger size outside the housing 10, and may form a screen of a larger size. When the roller 20 rotates in the counterclockwise direction R1, the screen 30 may be wound around the roller 20 and may be contracted into the housing 10 through the opening 11. Accordingly, as shown in (b) of FIG. 3, the screen 321 of (c) of FIG. 3 may be contracted to have a relatively smaller size inside the housing 310, thereby forming a smaller screen. When the roller 20 further rotates counterclockwise R2, the screen 30 may be further wound around the roller 20. Therefore, as shown in (a) of FIG. 3, the screen may not protrude to the outside of the housing 300, and may be completely accommodated in the housing 300.

A front portion of the screen 30, which is expanded from the TV system 100, may be protected by the window, while a rear portion of the screen 30 may be exposed. The screen 30 includes sensitive electronic components and substrates, and thus the screen 30 needs to be properly protected to prevent malfunction. Accordingly, as illustrated in (b) of FIG. 6, the TV system 100 may include the cover 40 configured to cover the rear portion of the extended screen 30.

The cover 40 may include a plurality of links connected to each other. The link may have a width corresponding to a width of the screen 30, and the links connected to each other, that is, the cover 40, may form a single plate covering the rear portion of the screen 30. Any one of the links is pivotable with respect to another adjacent link, and thus as shown in the drawing, the cover 40 may be wound around a first roller 41 and may be guided to a rear side of the screen 30 by the second roller 42.

When the screen 30 is expanded during an operation of the TV system 100, the first roller 41 may rotate to unwind the cover 40. The unwound cover 40 is guided by the second roller 41 and is attached to the rear portion of the screen 30. Accordingly, the cover 40 may be extended to the outside of the housing 10 together with the screen 30 to protect the rear portion of the screen 30.

When the screen 30 is contracted, the first roller 41 may rotate in an opposite direction to separate the cover 40 from the screen 30, and the separated cover 40 may be guided by the second roller 42 to be wound around the first roller 41. In the cover 40, the first roller 41 may be driven by the motor 21 together with the roller 20, and a separate motor for driving the first roller 41 may be installed in the housing 10.

The screen 30 may be difficult to maintain an expanded state due to the flexibility thereof. Accordingly, the TV system 100 may include the supporter 50 configured to support the extended screen 30. The supporter 50 may be extended to the outside of the housing 10 through the opening 11 by the motor 51 and the auxiliary supporter 52 connected thereto. Accordingly, the supporter 50 may be extended to the outside of the housing 10 together with the screen 30. Accordingly, the screen 30 expanded by the supporter 50 may be stably supported to display content to the user.

Figure 7:
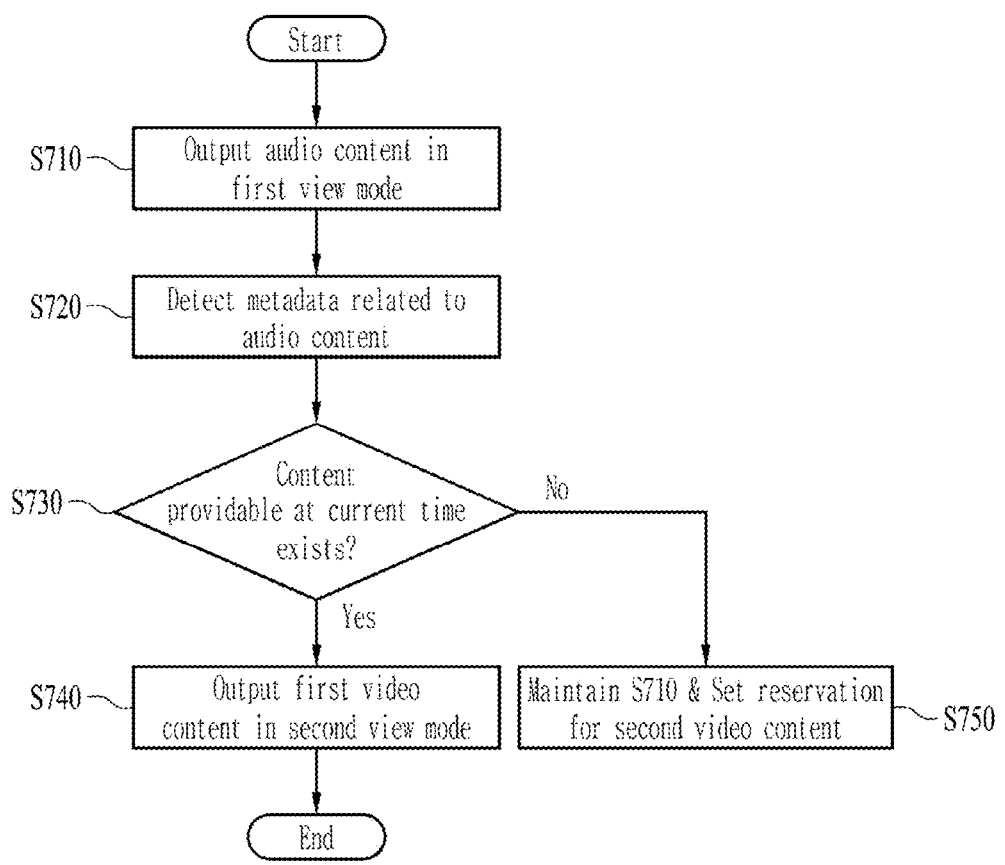
FIG. 7 is a flowchart illustrating a process of individually controlling audio/video data when switching from a first view mode to a second view mode according to an embodiment of the present disclosure.

FIG. 7 is a flowchart illustrating a process of individually controlling audio/video data when switching from a first view mode to a second view mode according to an embodiment of the present disclosure. The present disclosure is applicable to various TV systems (for example, FIGS. 3 to 5) in which a size of an exposed screen is changed by a motor.

First of all, a TV according to an embodiment of the present disclosure outputs an audio content in a first view mode (S710). The first view mode refers to a state in which only a portion of a screen of the TV is exposed or the screen is not exposed. More specifically, it corresponds to (a) and (b) of FIG. 3, (b) of FIG. 4, and (a) of FIG. 5.

Furthermore, the TV according to an embodiment of the present disclosure detects metadata related to the audio content (e.g., song title, singer information, music video information, etc.) (S720).

Yet, when the TV receives the audio content, related metadata may be received together, but there are cases where metadata related to the audio content is not received. To solve this problem, although not shown in FIG. 7, the TV according to an embodiment of the present disclosure receives the audio content outputted in the step S710 through a microphone and transmits the received audio content to a server. In addition, it is also within the scope of another right of the present disclosure to design to receive metadata corresponding to the audio content from the server.

Furthermore, the TV according to an embodiment of the present disclosure is designed to determine whether at least one video content corresponding to the metadata detected in the step S720 may be provided based on a current time (S730).

As a result of the determination (S730), if at least one video content corresponding to the detected metadata is available at the current time, the TV outputs a first video content in a second view mode (i.e., controlling a motor to fully expose the screen) (S740). The second view mode corresponds to, for example, (c) of FIG. 3, (a) of FIG. 4, or (b) of FIG. 5.

On the other hand, as a result of the determination (S730), if at least one video content corresponding to the detected metadata is available after the current time, a reservation for a second video content is set while maintaining the first view mode (i.e., continuing to output the audio content in the step S710).

Meanwhile, although not shown in FIG. 7, it is designed to use only metadata preferred by a specific user.

For example, information on a singer preferred by the specific user is automatically extracted based on usage history information of a user logged in to the TV or user information on a mobile phone paired with the TV. Alternatively, setting a singer name, a song genre, etc. preferred by the specific user in advance is also within the scope of another right of the present disclosure.

Accordingly, while a user of the TV according to an embodiment of the present disclosure plays a random music list in the first view mode, when an audio content of a singer designated or predicted to be preferred by the user is played, the TV immediately switches to the second view mode and displays a content in which the singer is performing or automatically makes a viewing reservation, a recording reservation, and the like of the corresponding content. In this case, the user does not need to manually adjust a size of a TV screen, and since the TV screen is switched to the second view mode only when necessary, power consumption may be minimized due to motor control, minimal display utilization, etc.

Yet, the TV according to an embodiment of the present disclosure is characterized in being automatically switched from the first view mode to the second view mode, and a case in which the user does not prefer such auto-switching may occur. A solution for this problem will be described with reference to FIG. 8 as follows.

Figure 8:
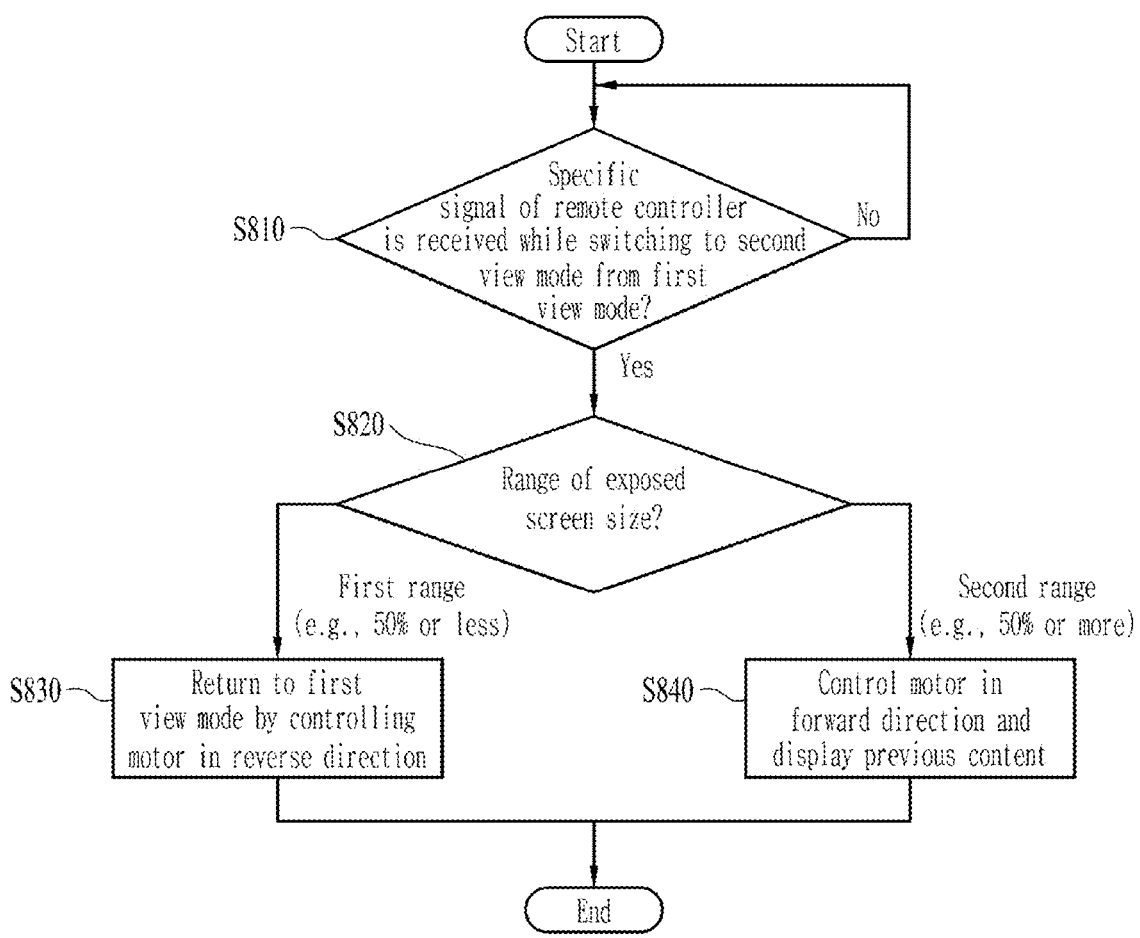
FIG. 8 is a flowchart illustrating a case of receiving a specific signal from a remote controller in the course of switching from a first view mode to a second view mode according to an embodiment of the present disclosure.

FIG. 8 is a flowchart illustrating a case where a specific signal is received from a remote controller in the course of switching from a first view mode to a second view mode, according to an embodiment of the present disclosure. FIG. 8 illustrates the step S740 illustrated in FIG. 7 in more detail.

The TV according to an embodiment of the present disclosure determines whether a specific signal of a remote controller has been received while switching from the first view mode to the second view mode (S810). In this regard, it will be described in more detail below with reference to FIG. 12 and FIG. 13.

When the specific signal is received from the remote controller as a result of the determination (S810), a level of exposure of the TV screen is determined based on this time point (S820).

When the specific signal is received from the remote controller while the size of the TV screen is exposed only in a first range (e.g., 50% or less, i.e., only within half of a total size of the TV screen), the motor is controlled in a reverse direction to return to the first view mode (S830).

On the other hand, when the specific signal is received from the remote controller while the size of the TV screen is exposed in a second range (e.g., 50% or more, i.e., at least half of the total size of the TV screen), a previous content is displayed with reference to a memory (S840). Here, the previous content refers to, for example, a content of a channel tuned by the TV in the just-previous second view mode.

When designed in this way, the TV according to an embodiment of the present disclosure has a technical effect of reducing power consumption by minimizing unnecessary motor control in a manner of more clearly determining a user's intention (e.g., whether to return to the previous view mode or whether to watch the content of the previous channel, etc.).

FIG. 8 illustrates the step S740 of FIG. 7 in more detail, and hereinafter, the step S750 of FIG. 7 will be described in more detail with reference to FIG. 9.

Figure 9:
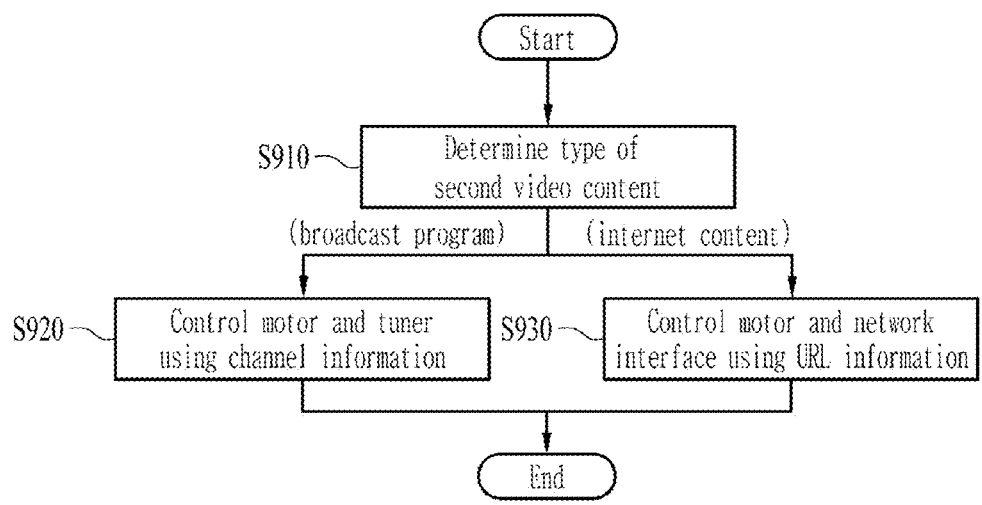
FIG. 9 is a flowchart illustrating a step S750 illustrated in FIG. 7 in more detail.

FIG. 9 is a flowchart illustrating the step S750 shown in FIG. 7 in more detail. According to this embodiment, since the video content associated with the audio content being outputted in the first view mode cannot be directly outputted based on the current time, and thus, a reservation function is used.

First of all, as shown in FIG. 9, the TV according to an embodiment of the present disclosure determines a type of the second video content that becomes a target of a viewing reservation or a recording reservation (S910).

As a result of the determination (S910), when the second video content becoming the target of the viewing reservation/recording corresponds to a broadcast program, the TV stores channel information and first time information of the second video content in the memory. Furthermore, when the current time corresponds to the first time information stored in the memory, the TV controls the tuner using the channel information stored in the memory and switches to the second view mode by controlling the motor (S920).

On the other hand, as a result of the determination (S910), when the second video content becoming the target of the viewing reservation/recording corresponds to an Internet content (e.g., a scheduled YouTube content (e.g., a specific singer scheduled for comeback)), the TV stores URL information and time information of the second video content in the memory. Furthermore, when the current time corresponds to the second time information stored in the memory, the TV is designed to control the network interface by using the URL information stored in the memory, and to switch to the second view mode by controlling the motor (S930).

Various embodiments for the TV having the previous FIGS. 1 to 9 applied thereto to change the size of the screen exposed using the motor will be described with reference to FIGS. 10 to 17.

Figure 10:
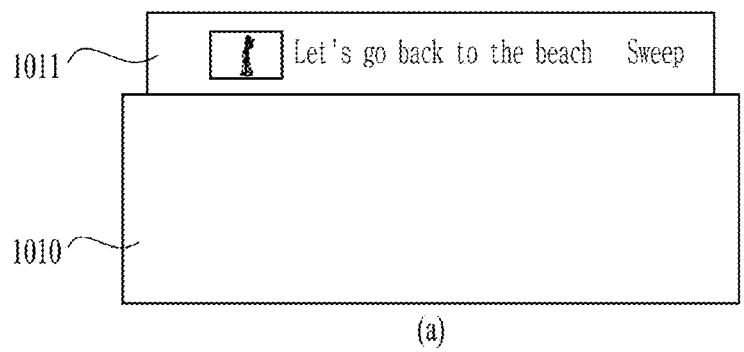
FIG. 10 is a diagram illustrating in detail a process of switching from a first view mode to a second view mode upon detecting a specific event according to an embodiment of the present disclosure.
Figure 10:
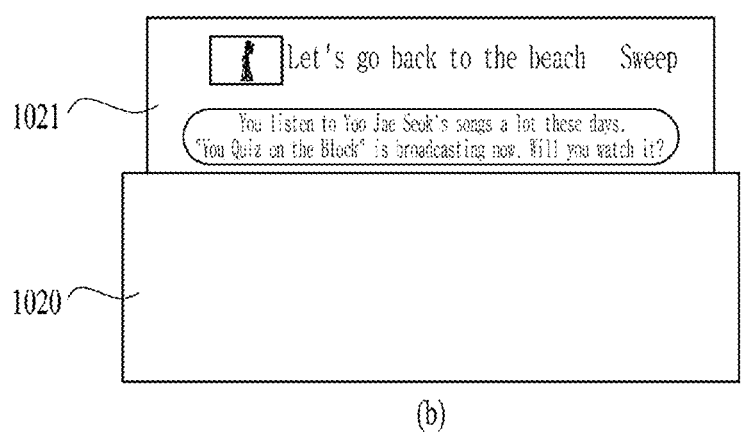
Figure 10:
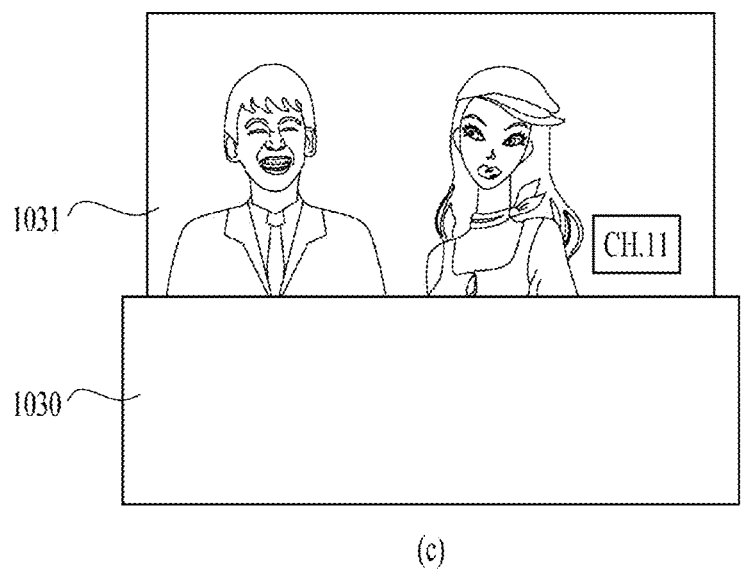

FIG. 10 illustrates in detail a process of switching from the first view mode to the second view mode upon detection of a specific event according to an embodiment of the present disclosure. In particular, in FIG. 10, as in the embodiment of FIG. 5, the covers 1010, 1020, and 1030 are fixed, and as the TV screen located at the rear of the cover moves, a level of exposure of the screen varies. Yet, although FIG. 5/FIG. 10 is illustrated as an example for convenience of explanation, the present disclosure is applicable to all TV systems in which the level of exposure of the TV screen is variable.

First, as shown in FIG. 10(*a*), it is assumed that only a portion 1011 of the TV screen is exposed and the rest is covered by a cover 1010. In this case, the TV randomly outputs a random audio content. Of course, in FIG. 10(*a*), it is assumed that only the portion of the TV screen is exposed, but as described above, the present disclosure may also be applied even when a random audio content is outputted in a state that the TV screen is not exposed at all.

Furthermore, the TV according to an embodiment of the present disclosure detects metadata (e.g., singer information, etc.) related to the audio content (e.g., song, etc.).

When the singer information included in the metadata corresponds to a singer preferred by a user who uses the TV, the controller of the TV collects information on a video content in which the singer appears.

If video content is available at a current time, as shown in FIG. 10(*b*), the TV according to an embodiment of the present disclosure is designed to display a message 1021 asking whether to view the video content.

And, as shown in FIG. 10(*c*), the TV according to an embodiment of the present disclosure controls the motor so that an entire screen 1031 is exposed and outputs the corresponding video content. Yet, designing to proceed directly from FIG. 10(*a*) to FIG. 10(*c*) by skipping the step in FIG. 10(*b*) falls within the scope of another right of the present disclosure.

Figure 11:
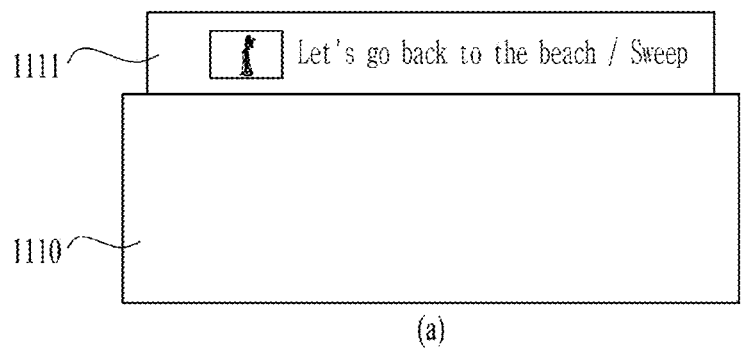
FIG. 11 is a diagram illustrating in detail a process of maintaining a first view mode upon detecting a specific event according to an embodiment of the present disclosure.
Figure 11:
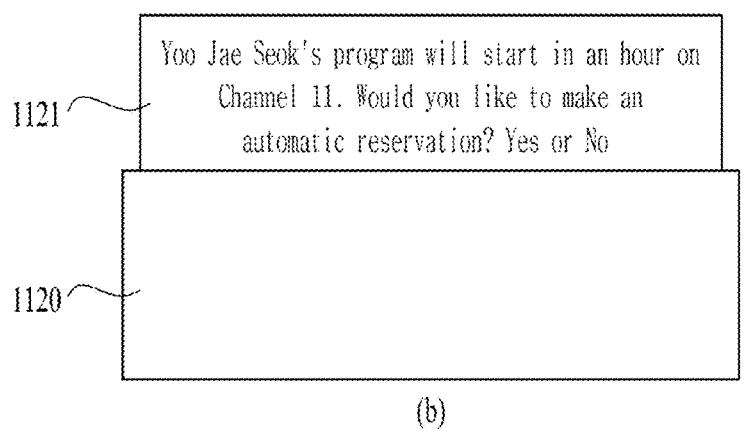

FIG. 11 illustrates in detail a process of maintaining the first view mode upon detecting a specific event according to an embodiment of the present disclosure. FIG. 11 illustrates an embodiment of a case that a video content related to an audio content being outputted is not currently available, whereas FIG. 10 illustrates the embodiment of the case that a video content related to an audio content being outputted is currently available.

In FIG. 11, like the embodiment of FIG. 10, a cover 1110/1120 is fixed. As the TV screen located in rear of the cover moves, the level of exposure of the screen varies. Yet, the present disclosure is applicable to all TV systems in which the level of exposure of the TV screen is variable.

First of all, as illustrated in FIG. 11(*a*), it is assumed that only a portion 1111 of the TV screen is exposed and the rest is covered by a cover 1110. In this case, the TV randomly outputs a random audio content. Of course, in FIG. 11(*a*), it is assumed that only a portion of the TV screen is exposed, but as described above, the present disclosure may also be applied even when a random audio content is outputted in a state in which the TV screen is not exposed at all.

12(*a*). And, the TV is designed to play the audio content initially being played in FIG. 12(*a*) in the same manner.

That is, according to an embodiment of the present disclosure, by storing the data of Table 1 below in advance in the memory of the TV, there is a technical effect of more accurately estimating user's intention.

TABLE 1

| Motor control direction | Upon receiving of a specific key, TV screen exposure level | Upon receiving a specific key, two types of operations of TV |
|---|---|---|
| Screen up (UP) | 50% or less | Control motor backward & play music outputted in zero/partial view |
|  | 50% or more | Maintain motor control direction & connect to previous channel/YouTube/external input |
| Screen down {Down} | 50% or less | Maintain motor control direction & output audio of broadcast outputted in full view only |
|  | 50% or more | Control motor backward & no content change |

Furthermore, the TV according to an embodiment of the present disclosure detects metadata (e.g., singer information, etc.) related to the audio content (e.g., song, etc.).

When the singer information included in the metadata corresponds to a singer preferred by a user who uses the TV, the controller of the TV collects information on the video content in which the singer appears.

If the video content is not available at a current time (e.g., if the current time is 9:00 AM, whereas the video content is 11:30 AM), the TV according to an embodiment of the present disclosure is designed to display a message 1121 asking whether to make a reservation (e.g., a viewing reservation or a recording reservation) of the corresponding video content.

Yet, skipping the step of FIG. 11(*b*) and automatically making a recording reservation or a viewing reservation for the corresponding video content may fall in the scope of other rights of the present disclosure.

Figure 12:
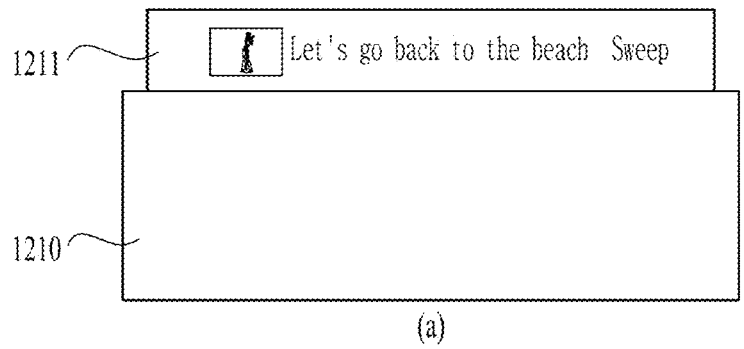
FIG. 12 is a diagram illustrating in detail a process of returning to a first view mode upon receiving a specific signal of a remote controller in the course of switching from a first view mode to a second view mode according to an embodiment of the present disclosure.
Figure 12:
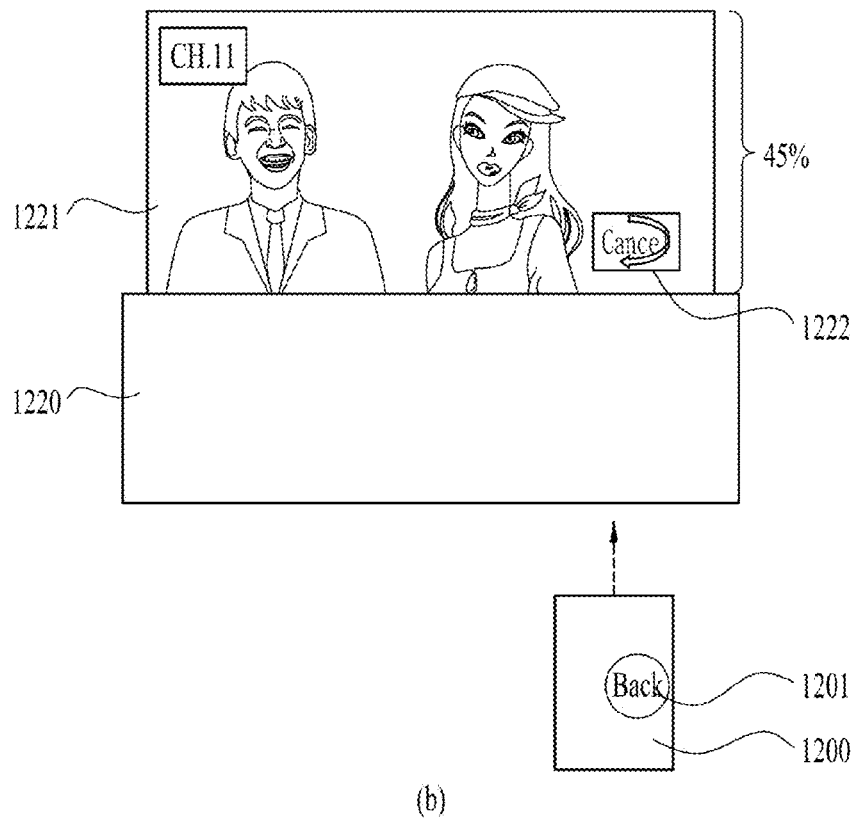
Figure 12:
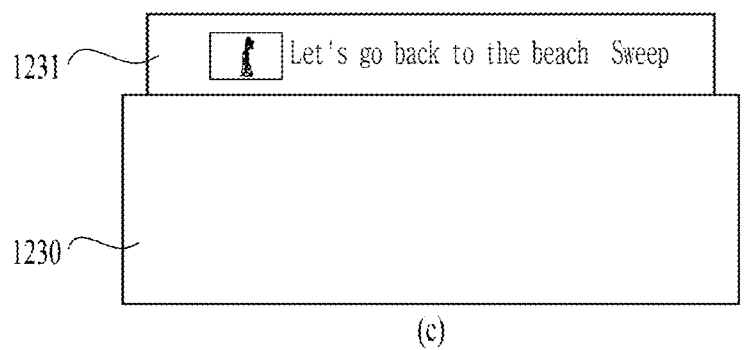

FIG. 12 illustrates in detail a process of returning to the first view mode when a specific signal of a remote controller is received in the course of switching from the first view mode to the second view mode, according to an embodiment of the present disclosure, which is, for example, applicable to the process of switching from FIG. 10(*a*) to FIG. 10(*c*).

Covers 1210, 1220, and 1230 shown in FIG. 12 are assumed as fixed, and a level of exposing the screen of the TV only is assumed as variable.

As shown in FIG. 12(*a*), the TV plays a random audio content while only a portion 1211 of the screen is exposed. As described above, when singer information preferred by a user is detected while the random audio content is played, the TV tunes to a channel of a broadcast content in which a corresponding singer currently appears and controls the motor to fully expose the TV screen.

Yet, when the TV receives a specific key 1201 (e.g., a back button or a cancel button) of a remote controller 1200 before the TV screen is fully exposed, e.g., while 50% or less of the TV screen is exposed, the TV according to an embodiment of the present disclosure determines that the user intends to return the screen state to the previous state. More specifically, in the TV according to an embodiment of the present disclosure, by referring to Table 1 (data previously stored in the TV memory) below, as shown in FIG. 12(*a*), a TV screen 1231 is reduced again and changes to have the same size as the TV screen size shown in FIG.

Of course, in order to help a guide of a user, as shown in FIG. 12(*b*), when a TV screen 1221 is exposed by 50% or less, an indicator 1222 for indicating that the motor can be controlled in a reverse direction is additionally displayed.

On the other hand, in the course of switching from the first view mode to the second view mode, an embodiment for a case that the TV receives a specific key input (e.g., back, cancel button, etc.) of the remote controller in a state that the TV screen 1221 is exposed by more than 50% will be described later with reference to FIG. 13.

Figure 13:
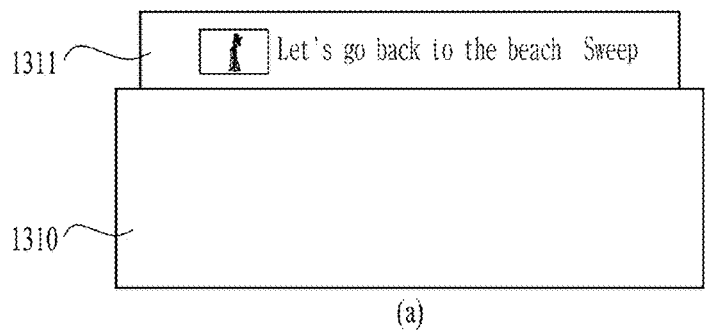
FIG. 13 is a diagram illustrating in detail a process of completing a second view mode upon receiving a specific signal of a remote controller in the course of switching from a first view mode to the second view mode according to an embodiment of the present disclosure.
Figure 13:
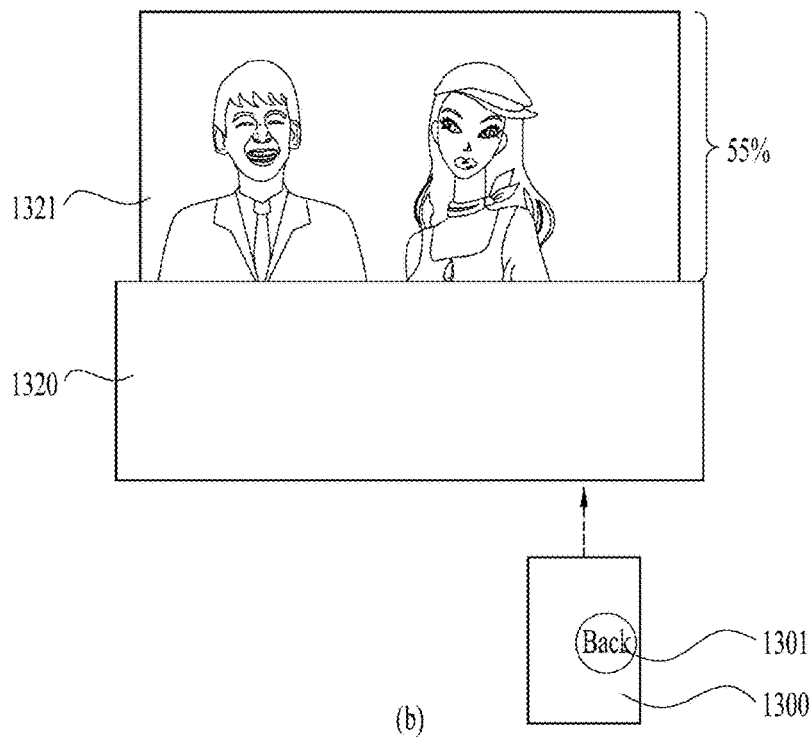
Figure 13:
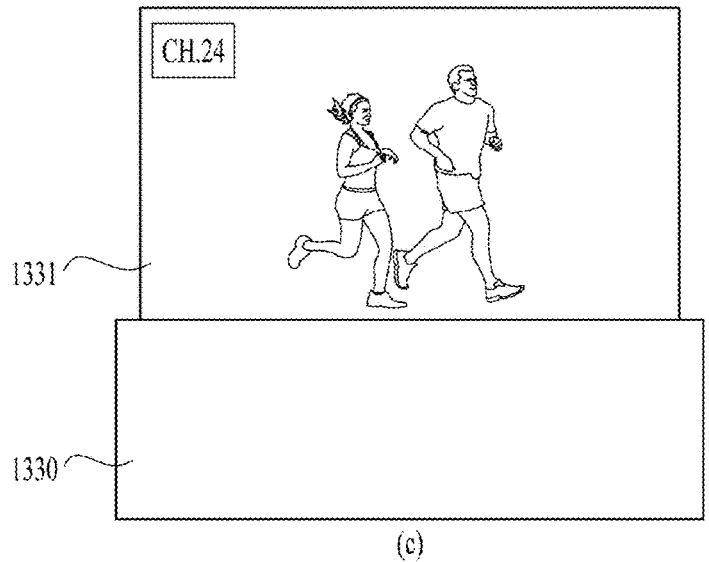

FIG. 13 illustrates in detail a process of completing the second view mode when a specific signal of the remote controller is received in the course of switching from the first view mode to the second view mode according to an embodiment of the present disclosure.

It is assumed that covers 1310, 1320, and 1330 shown in FIG. 13 are fixed and that a level of exposing a screen of a TV only is variable.

As shown in FIG. 13(*a*), the TV plays a random audio content while only a portion 1311 of the screen is exposed. As described above, when singer information preferred by a user is detected during playback of the random audio content, the TV tunes to a channel of a broadcast content in which the corresponding singer currently appears, and controls the motor to expose the TV screen fully.

Yet, although it is before the TV screen is fully exposed, for example, when the TV receives a specific key 1301 (e.g., a back button or a cancel button) of the remote controller 1300 while the TV screen is exposed by more than 50%, in this case, the TV according to an embodiment of the present disclosure determines that the user intends to view the content (e.g., a previous channel) previously viewed in the second full view mode instead of intending to change the state of the screen. More specifically, as shown in FIG. 13(*c*), the TV according to an embodiment of the present disclosure exposes the TV screen 1331 by 100% without reducing the TV screen 1331 with reference to Table 1 (i.e., the data pre-stored in the TV memory) above. Yet, in this case, the TV returns to the channel tuned in the just-previous second view mode. Of course, in the just-previous second view mode, in case of a state of outputting a video (e.g., YouTube) through an Internet connection instead of outputting a broadcast program or a state of outputting video data of another external device (e.g., a BD player, etc.) connected to the TV through an external input interface (e.g., HDMI, etc.), the TV screen is exposed to the maximum level (e.g., 100%) and outputs the internet video or the video data received from the external device.

For example, if the TV screen is exposed by more than 50%, the back button of the remote controller is designed to be unable to adjust the motor in the reverse direction in the course of switching from the first view mode to the second view mode. And, in order to guide the user with such information, as shown in FIG. 13(b), the indicator 1222 shown in FIG. 12(b) is no longer displayed in the state where the TV screen 1321 is exposed by more than 50%. As another embodiment of the present disclosure, it is also possible to set a criterion for disappearing the indicator shown in FIG. 12(b) to change depending on a resolution (or aspect ratio) of the video content.

Therefore, a technical effect is expected in reducing the possibility of failure due to frequent change of direction of the motor and it is advantageous in being able to guide a user in advance what function the back button of the remote controller performs.

On the other hand, in FIG. 12 and FIG. 13, with only a portion of the TV screen exposed, the TV screen moves in the UP direction by controlling the motor and the exposed TV screen size is enlarged.

Yet, even when the TV screen is fully exposed, the present disclosure is also applicable to a case that the motor is controlled to move the TV screen in the DOWN direction so as to reduce the exposed TV screen size.

For example, when a TV screen down command is received while the TV screen is fully exposed (i.e., in full view), the TV screen moves in the DOWN direction. If the TV screen gradually moves down and the exposure range of the screen becomes 50% or less (but this numerical value is changeable if necessary) compared to the state where the TV screen is fully exposed, a video signal playback of the content being outputted in the fully exposed state of the TV screen is stopped and only the audio signal is outputted. When a specific key of the remote controller (e.g., a back button or a cancel button) is received at the time when only the audio signal is outputted (i.e., when the TV screen is exposed by 50% or less), even the output of the audio signal is stopped, and the music content previously played in the partial view state is designed to be played or a setting screen or the like previously displayed in the partial view state is designed to be displayed. To implement this, the data in Table 2 below are stored in the memory of the TV.

TABLE 2

|  | Source of just-previous playback content | Just-previous playback content |
|---|---|---|
| Play history in full view state | Broadcast | Channel information |
|  | External input | Interface information (ex: HDMI1or HDMI2) |
|  | Server | Application information |
| Play history in partial view state | Internal memory | Settings menu |
|  | External device (e.g. mobile phone) or server | Music information |

On the other hand, when the TV screen is exposed by 50% or more (yet, this number is changeable if necessary) at the time of receiving the specific key of the remote controller, the TV according to an embodiment of the present disclosure controls the motor in the reverse direction with reference to Table 1 above and maintains a state (i.e., full view of the TV screen) of fully exposing the TV screen again. In this case, the content does not change in particular. For example, both the video and audio of the broadcast of the channel being outputted at the time of receiving the specific key are normally outputted.

Figure 14:
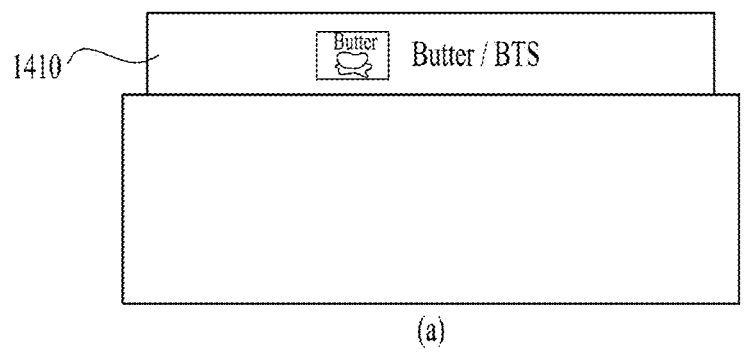
FIG. 14 is a diagram illustrating at least one option provided in the course of switching from a first view mode to a second view mode according to an embodiment of the present disclosure.
Figure 14:
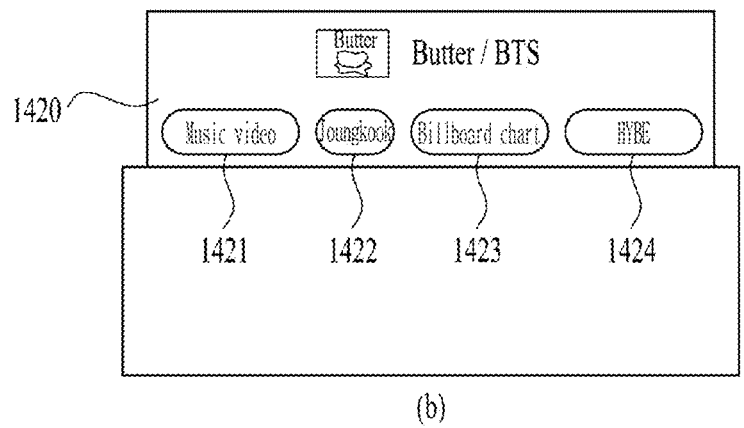
Figure 14:
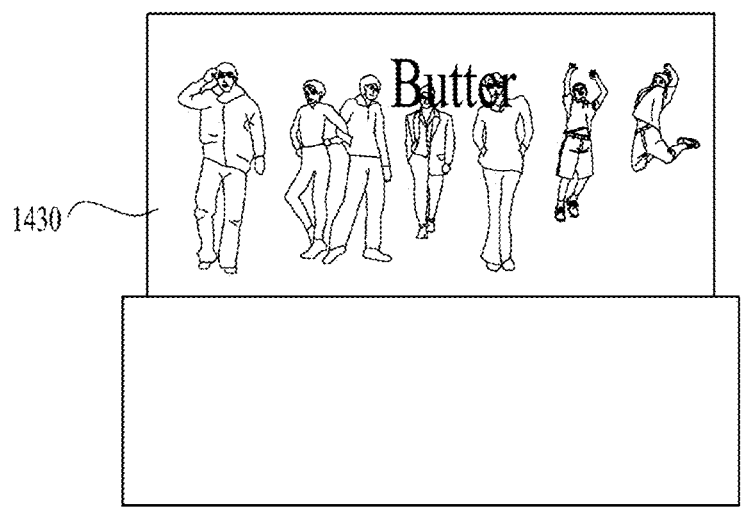

FIG. 14 illustrates at least one option provided in the course of switching from the first view mode to the second view mode according to an embodiment of the present disclosure.

As shown in FIG. 14(a), the TV according to an embodiment of the present disclosure outputs a random audio content in a state in which only a portion 1410 of the screen is exposed in the first view mode.

Furthermore, the TV according to an embodiment of the present disclosure detects various metadata mapped to the audio content. And, as shown in FIG. 14(b), the TV according to an embodiment of the present disclosure displays a first option 1421, a second option 1422, a third option 1423, and a fourth option 1424 based on the detected metadata.

If the first option 1421 is selected, as shown in FIG. 14(c), the TV according to an embodiment of the present disclosure fully exposes a screen 1430 while switching to the second view mode and displays a music video corresponding to the audio content.

Figure 15:
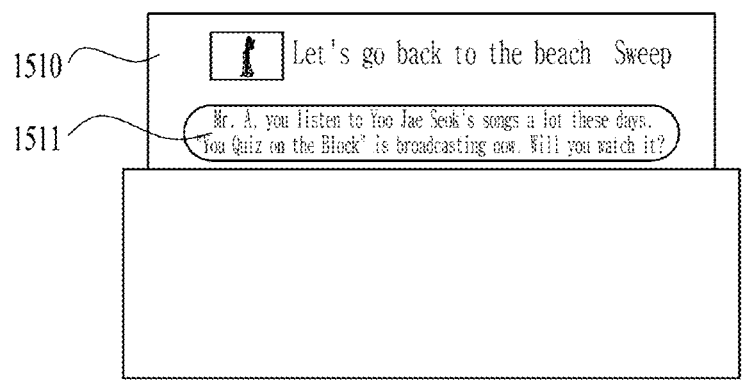
FIG. 15 is a diagram illustrating a solution in case of recognizing a plurality of users are in the course of switching from a first view mode to a second view mode according to an embodiment of the present disclosure.
Figure 15:
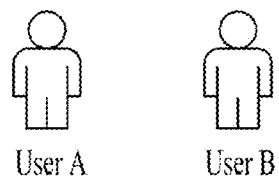
Figure 15:
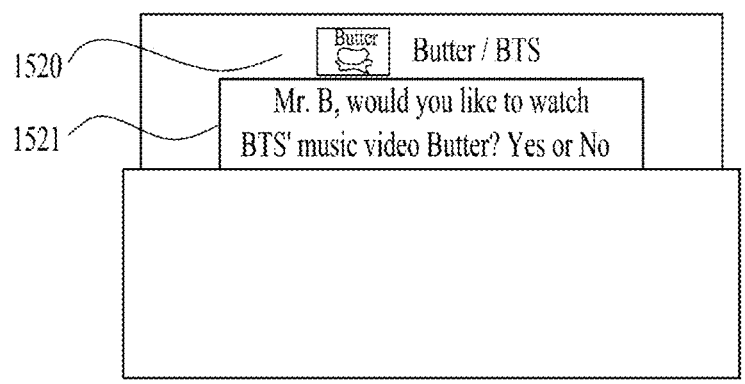
Figure 15:
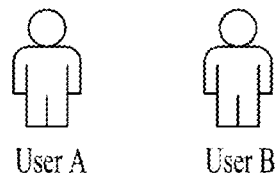

FIG. 15 illustrates a solution for a case that a plurality of users are recognized in the course of switching from the first view mode to the second view mode according to an embodiment of the present disclosure.

First of all, the TV according to an embodiment of the present disclosure recognizes both user A and user B around the TV by utilizing a face recognition function of the camera and detects singer information preferred by each of the user A and user B based on TV usage history information (e.g., login information utilization, etc.). Alternatively, based on the information received from user A's mobile phone and user B's mobile phone, the TV may estimate singer information preferred by each of the user A and user B.

As illustrated in FIG. 15(a), a random first audio content is outputted while only a portion 1510 of the TV screen is exposed. In this case, when the first audio content is detected as being preferred by the user A, the TV displays a message 1511 asking whether to output a video content related to the first audio content in the second view mode (i.e., a state in which the TV screen is fully exposed) on the portion 1510 of the screen. Of course, omitting the display of the message 1511 and automatically switching to the second view mode falls within the scope of other rights of the present disclosure.

As illustrated in FIG. 15(b), a random second audio content is outputted while only a portion 1520 of the TV screen is exposed. In this case, when the second audio content is detected as being preferred by the user B, the TV displays a message 1521 on the portion 1520 of the screen to ask whether to output a video content related to the second audio content in the second view mode (in a state in which the TV screen is fully exposed). Of course, omitting the display of the message 1521 and automatically switching to the second view mode falls within the scope of other rights of the present disclosure.

Meanwhile, although not illustrated in FIG. 15, the present disclosure may be extended and applied even when an audio content is not played. For example, when a plurality of users illustrated in FIG. 15 are detected, in the first view mode, a per-user preferred content, reservation setting information, and the like are displayed. When only one user is specified, an image to be displayed in the second view mode is changed based on it.

Figure 16:
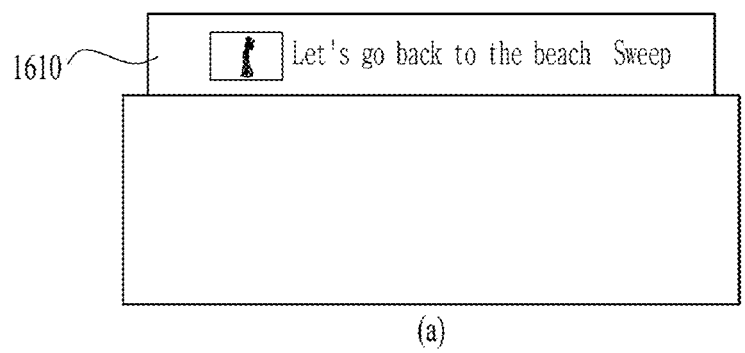
FIG. 16 is a diagram illustrating a solution for selecting an audio source after switching from a first view mode to a second view mode according to an embodiment of the present disclosure.
Figure 16:
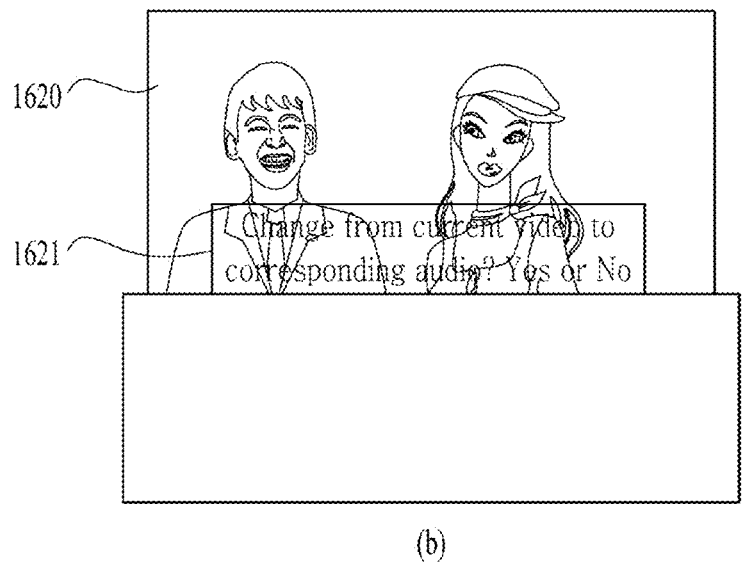

FIG. 16 illustrates a solution for selecting an audio source after switching from the first view mode to the second view mode according to an embodiment of the present disclosure.

As shown in FIG. 16(a), an audio content is outputted while only a portion 1610 of the TV screen is exposed. If a video content related to the audio content exists, as shown in FIG. 16(b), an entire part 1620 of the TV screen is exposed.

In this case, in a state of fully exposing the screen (FIG. 16(b)), immediately or after a certain period of time has elapsed, an audio content corresponding to a video content shown in FIG. 16(b) is outputted instead of the audio content that is being outputted in a state where only a portion of the screen is exposed or the screen is not exposed (FIG. 16(a)).

Alternatively, as shown in FIG. 16(b), it is also within the scope of other rights of the present disclosure to provide an option 1621 for the user to select an audio source.

Figure 17:
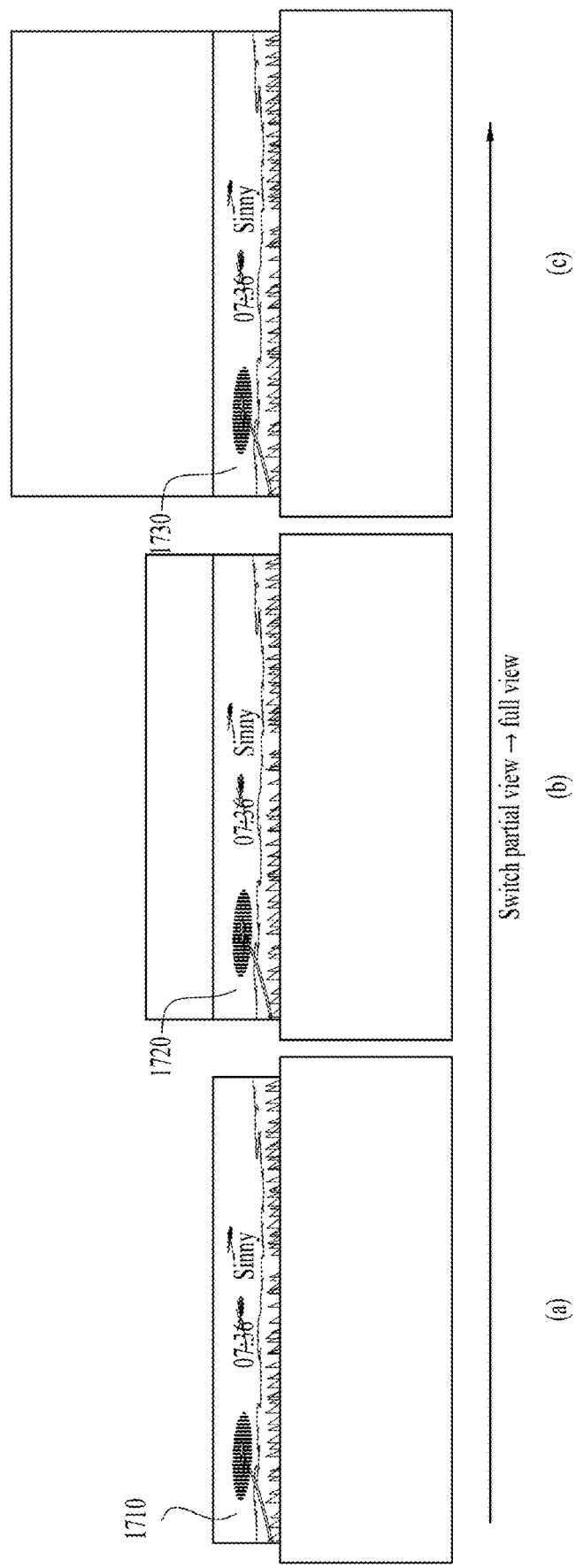
FIG. 17 is a diagram illustrating a solution for preventing an afterimage by maintaining video data of a first view mode according to another embodiment of the present disclosure.

FIG. 17 illustrates a solution for preventing an afterimage by maintaining video data of the first view mode according to another embodiment of the present disclosure.

When switching from the first view mode shown in FIG. 17(a) to the second view mode shown in FIG. 17(c) through an intermediate process of FIG. 17(b) to the second view mode shown in FIG. 17(c), an area in which a random content (e.g., clock, etc.) is displayed within the TV screen is displayed in a manner of gradually moving down so as not to change absolute positions 1,710, 1720, and 1730 at which the random content (e.g., clock, etc.) is displayed.

In addition, the area in which the clock was displayed originally is displayed with, for example, the same color as the color or pattern of a surrounding wall on which the TV is installed. When designing in this way, there is a technical effect of removing an afterimage phenomenon caused by exposing only a partial area of the TV screen for a long time.

Meanwhile, the above-described embodiments may also be implemented in the TV shown in FIG. 2.

For example, the memory 215 stores at least one data.

The motor 210 changes an exposed size of the TV screen with reference to the memory 215.

The audio output unit 207 outputs an audio content while only a portion of the TV screen is exposed or the TV screen is not exposed.

The controller 209 detects metadata related to the audio content.

Furthermore, for example, if at least one video content corresponding to the detected metadata is available at the current time, the controller 209 controls the motor 210 to fully expose the screen and outputs a first video content.

On the other hand, if at least one video content corresponding to the detected metadata is available after the current time, the controller 209 continues to output the audio content and sets a reservation for a second video content.

For example, the controller 209 receives the outputted audio content through a microphone (not shown), transmits the received audio content to a server through the network interface (e.g., the reference number 213 shown in FIG. 2), and receives metadata corresponding to the audio content from the server through the network interface.

For example, while the size of the screen is exposed by 50% or less, when a specific signal is received from the remote controller, the controller 209 controls the motor 210 in the reverse direction so that only a portion of the screen is exposed or the screen above is not exposed.

For example, while the size of the screen exceeds 50%, when a specific signal is received from the remote controller, the controller 209 refers to the memory 215 and displays a previous content that was displayed while the screen was fully exposed.

For example, in a state that the screen is fully exposed, immediately or after elapse of a predetermined time, the controller 209 outputs an audio content corresponding to the first video content instead of the audio content being outputted in the state the screen was exposed partially or the screen was not exposed.

For example, when the second video content corresponds to a broadcast program, the controller 209 controls the motor 210 and the tuner 201 at a scheduled time of the second video content using channel information.

On the other hand, when the second video content corresponds to an Internet content, the controller 209 controls the motor 210 and the network interface (e.g., the wireless communication module shown in FIG. 2) at the scheduled time of the second video content using URL information.

MODE FOR DISCLOSURE

Various embodiments of the present disclosure are described in the previous table of contents, "Best Mode", and combining the embodiments described in two or more drawings by those skilled in the art as necessary falls within the scope of the rights of the present disclosure.

INDUSTRIAL APPLICABILITY

Since the present disclosure is applicable to TVs of various form factors such as rollable TVs and the like, industrial applicability is recognized.

What is claimed is:

1. A method of controlling a TV having an exposed size of a screen changed by a motor, the method comprising:
outputting an audio content in a state of partially exposing the screen or not exposing the screen;
detecting metadata related to the audio content;
based on providing at least one video content related to the detected metadata at a current time, outputting a first video content by controlling the motor to fully expose the screen; and
based on providing the at least one video content related to the detected metadata after the current time, setting a reservation for a second video content while continuing to output the audio content.

2. The method of claim 1, the detecting further comprising:
receiving the outputted audio content through a microphone;
transmitting the received audio content to a server; and
receiving the metadata related to the audio content from the server.

3. The method of claim 1, wherein the outputting the first video content further comprises, based on receiving a specific signal from a remote controller in a state of exposing a size of the screen in a first range only, controlling the motor in a reverse direction to partially expose the screen only or not to expose the screen.

4. The method of claim 3, wherein the outputting the first video content further comprises, based on receiving the specific signal from the remote controller in a state of exposing the size of the screen in a second range greater than the first range, displaying a previous content used to be displayed in a state of fully exposing the screen with reference to a memory.

5. The method of claim 1, wherein the outputting the first video content further comprises outputting an audio content related to the first video content immediately or after a certain period of time from the state of fully exposing the screen instead of the audio content being outputted in the state of partially exposing the screen only or not exposing the screen.

6. The method of claim 1, the setting the reservation for the second video content, further comprising:
based on the second video content related to a broadcast program, controlling the motor and a tuner at a time of scheduling the second video content using channel information; and
based on the second video content related to an Internet content, controlling the motor and a network interface at the time of scheduling the second video content using URL information.

7. A TV comprising:
a memory storing at least one data;
a motor changing an exposed size of a screen with reference to the memory;
an audio output unit outputting an audio content in a state of partially exposing the screen or not exposing the screen; and
a controller detecting metadata related to the audio content,
wherein based on providing at least one video content related to the detected metadata at a current time, the controller is configured to control the motor to fully expose the screen and output a first video content and
wherein based on providing the at least one video content related to the detected metadata after the current time, the controller is configured to continue to output the audio content and set a reservation for a second video content.

8. The TV of claim 7, wherein the controller receives the outputted audio content through a microphone, transmits the received audio content to a server through a network interface, and receives the metadata related to the audio content from the server through the network interface.

9. The TV of claim 7, wherein based on receiving a specific signal from a remote controller in a state of exposing the size of the screen by 50% or less only, the controller controls the motor in a reverse direction to partially expose the screen or not to expose the screen.

10. The TV of claim 9, wherein based on receiving the specific signal from the remote controller in a state of exposing the size of the screen by 50% or more, the controller displays a previous content used to be displayed in a state of fully exposing the screen with reference to the memory.

11. The TV of claim 7, wherein the controller outputs an audio content related to the first video content immediately or after a certain period of time from the state of fully exposing the screen instead of the audio content being outputted in the state of partially exposing the screen only or not exposing the screen.

12. The TV of claim 7, wherein based on the second video content related to a broadcast program, the controller controls the motor and a tuner at a time of scheduling the second video content using channel information and wherein based on the second video content related to an Internet content, the controller controls the motor and a network interface at the time of scheduling the second video content using URL information.

* * * * *